(12) United States Patent  
Marvin et al.

(10) Patent No.: US 8,878,411 B2  
(45) Date of Patent: Nov. 4, 2014

(54) HIGH EFFICIENCY PERMANENT MAGNET MACHINE WITH SEPARATED TAB POLE ROTOR AND STACKED CERAMIC MAGNET SECTIONS

(75) Inventors: Russel Hugh Marvin, Goshen, CT (US); Nigel Shepherd, Middlebury, CT (US)

(73) Assignee: LCDrives Corp., Goshen, CT (US)

( * ) Notice: Subject to any disclaimer, the term of this patent is extended or adjusted under 35 U.S.C. 154(b) by 289 days.

(21) Appl. No.: 13/438,792

(22) Filed: Apr. 3, 2012

(65) Prior Publication Data

US 2013/0257212 A1    Oct. 3, 2013

(51) Int. Cl.  
*H02K 21/12* (2006.01)

(52) U.S. Cl.  
USPC ...................................... 310/156.66

(58) Field of Classification Search  
CPC ....... H02K 21/044; H02K 1/243; H02K 3/51; H02K 9/06  
USPC ...................... 310/261.1, 263, 156.01–156.84  
See application file for complete search history.

(56) References Cited

U.S. PATENT DOCUMENTS

| 5,177,391 | A  | * | 1/1993 | Kusase ........................ 310/263 |
| 6,433,457 | B1 | * | 8/2002 | Nakamura .................... 310/263 |
| 8,179,012 | B2 | * | 5/2012 | Schoenherr et al. ..... 310/156.66 |
| 2007/0046139 | A1 | * | 3/2007 | Ishizuka ....................... 310/263 |
| 2011/0095637 | A1 | * | 4/2011 | Badey ..................... 310/156.08 |

* cited by examiner

*Primary Examiner* — Hanh Nguyen  
(74) *Attorney, Agent, or Firm* — Tarolli, Sundheim, Covell & Tummino LLP

(57) ABSTRACT

A permanent magnet motor, generator or the like that uses ceramic magnets in the rotor to concentrate the magnetic flux in the airgap. Poles are formed by pole plates with integral tabs forming north and south poles with magnetic separators therebetween. Magnet sections are stacked axially.

18 Claims, 8 Drawing Sheets

SPM                    IPM                    Flux squeeze

HIGH EFFICIENCY PERMANENT MAGNET MACHINE WITH SEPARATED TAB POLE ROTOR AND STACKED CERAMIC MAGNET SECTIONS

BACKGROUND OF THE INVENTION

Rotary electric machines including electric motors, generators, and the like have employed permanent magnets for some time. These machines take on many different topologies, the two most common topologies that use internal rotors being "Surface Permanent Magnet—SPM" and "Interior Permanent Magnet—IPM." Additionally there is a topology "Interior PM—flux squeeze" that is also shown in the prior art. These topologies can be seen in the following patents and applications incorporated herein by reference:

| U.S. Pat. App. No. | 2007/0057589 | shows IPM |
|---|---|---|
| U.S. Pat. No. | 7,362,025 | shows IPM |
| U.S. Pat. No. | 6,703,746 | shows IPM |
| U.S. Pat. App. No. | 2009/0134731 | shows SPM |
| U.S. Pat. No. | 7,486,037 | shows SPM |
| U.S. Pat. No. | 3,072,813 | shows interior PM - flux squeeze |
| U.S. Pat. No. | 7,148,598 | shows interior PM - flux squeeze |

Generally high efficiency motors and generators use rare earth magnets that contain Neodymium (Nd) and Dysprosium (Dy) which are both expensive and which may be limited in supply at times. The lowest cost magnets per energy density are generally ceramic-based magnets. These magnets have lower magnetic properties than their rare earth counterparts but are readily available and inexpensive.

It is the general object of the present invention to provide a high efficiency rotary electric machine employing lower strength permanent magnets.

A further object of the invention is to provide rotary electric machines of the aforesaid type with magnet sections arranged in axially extending series for substantial enhancement of machine performance.

SUMMARY OF THE INVENTION

In fulfillment of the forgoing object and in accordance with the present invention a magnet configuration is used that concentrates the lower strength magnets into high flux density in the airgap. This is accomplished by separating the rotor into layers where each layer is a self-contained multi-pole rotor. In an internal rotor configuration, these layers each have a flat disc shaped magnet in the center with magnetically soft material that has alternating integral tabs that generate alternating north and south poles. These magnet sections are stacked mating north poles to north poles and south poles to south poles.

An important feature of the invention resides in the provision of magnetic separators between alternating tabs to prevent flux from shorting between poles.

Rotor sections can be held together axially and rotationally at their center sections at a common shaft by means of non-magnetic spacers or by using a non-magnetic shaft. Various attachment means may be employed including press fits, keyways, and the like. In addition, it is advantageous to provide a means of holding each magnet section to each other in low flux density regions because the magnetic forces urge the magnet sections apart and attachment at the center of rotation only may not be sufficient.

DESCRIPTION OF PREFERRED EMBODIMENT

Figure 1:
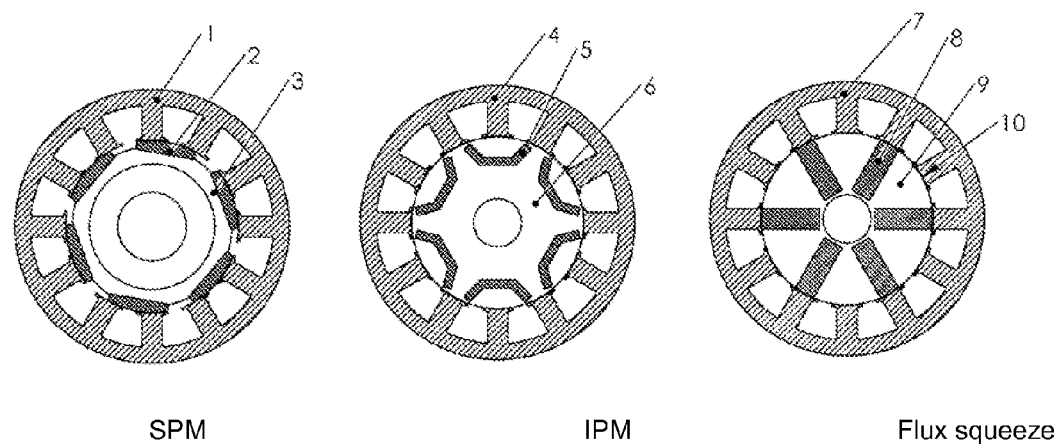
FIG. 1 is a schematic view of three different types of prior art. These include Surface Permanent Magnet (SPM), Interior Permanent Magnet (IPM), and Interior PM-flux squeeze (Flux squeeze)
Figure 2:
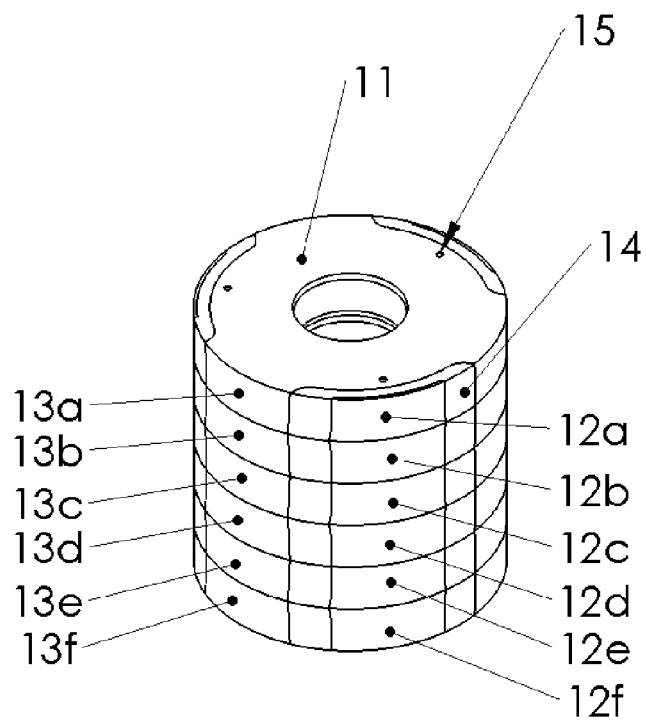
FIG. 2 shows a stack of magnet sections in a 6-pole design.
Figure 4:
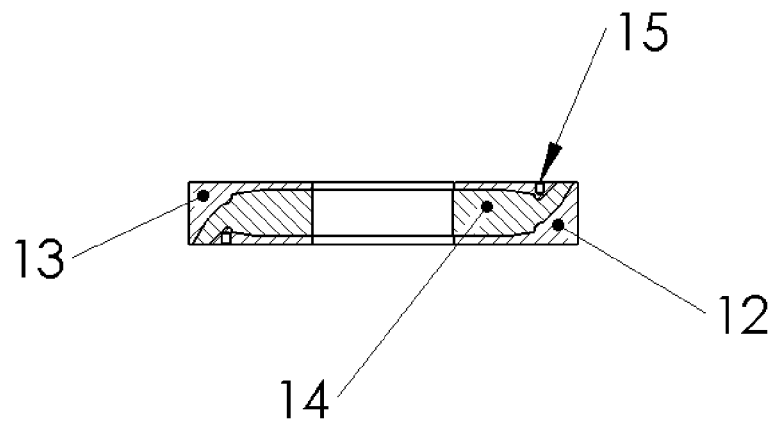
FIG. 4 shows a cross section of the magnet section of FIG. 3.

Referring particularly to FIG. 2, a stack of six (6) magnet assemblies or sections 11 is shown in a six pole configuration. Each section has three north poles 12a-12f and three south poles 13a-13f respectively located on tabs extending from opposite pole plates 12 and 13, FIG. 4. Ceramic magnet 14 is disposed between the pole plates 12 and 13 and through openings 15,15 are provided in areas of low flux density. Tabs of the same polarity are aligned axially with each other as shown in FIG. 2 with tabs 12a-12f aligned axially and tabs 13a-13f similarly aligned.

Figure 5:
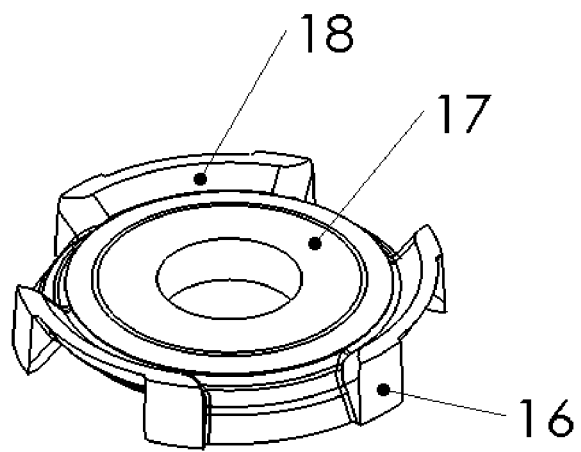
FIG. 5 shows the ceramic magnet portion of the magnet section of FIG. 3.
Figure 13:
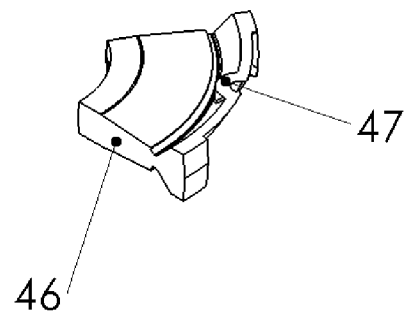
FIG. 13 shows a segmental part of a multi-part magnet.

The ceramic magnet per se is best shown in FIG. 5 and has a center region 17 that is magnetized similar to a speaker magnet with north and south poles on opposite generally planar faces. Circumaxially spaced pole separation regions or separators 16,16 may be integral with the magnet or may be separate parts. They are magnetized orthogonal to the center region 17 with the magnetizing direction extending arcuately between tabs 12 and 13 in FIG. 3. Tab separation regions are magnetized generally perpendicular to conical inner surfaces 18,18 of connectors extending to the center region 17. An alternate configuration of the magnet is shown in FIG. 13 where segments of a magnet are made separately and joined together at 46.

Figure 12:
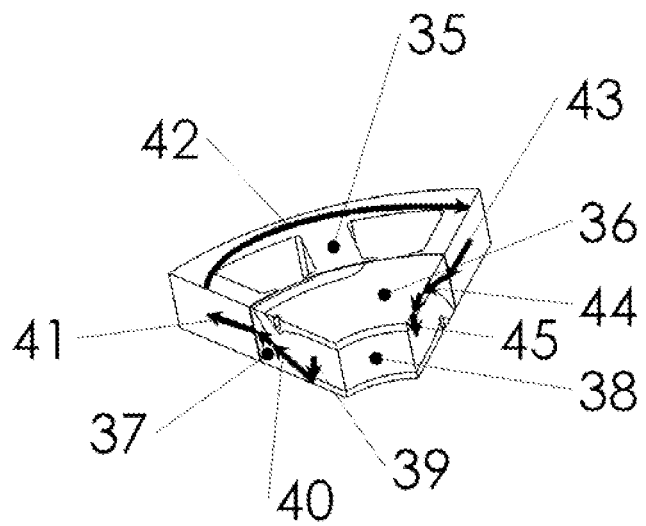
FIG. 12 shows a 3D sectional view of the magnet assembly with the flux path shown.

The flux path is shown in FIG. 12 with flux supplied by magnet 38 traveling in the direction of arrow 39. The flux then travels through pole plate at 37 in the direction of arrow 40, exits through the pole tab and crosses the air gap to the stator. Arrows 41,42, and 43 show flow through the stator and arrow 44 shows the return flow across the air gap to the pole plate at 36. Finally the flux returns to the magnet as illustrated by the arrow 45.

Figure 3:
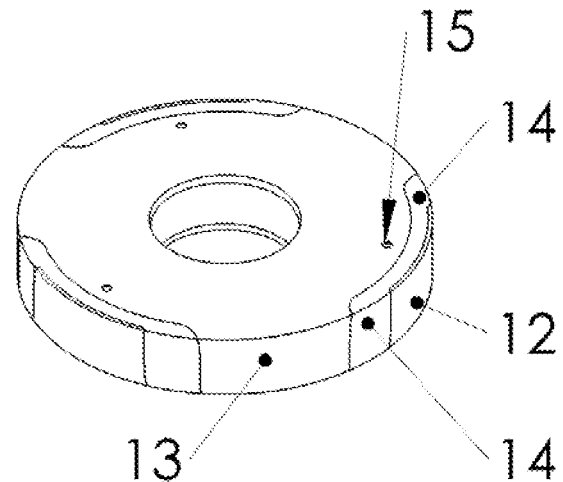
FIG. 3 shows a single magnet section of the type shown in FIG. 2.
Figure 9:
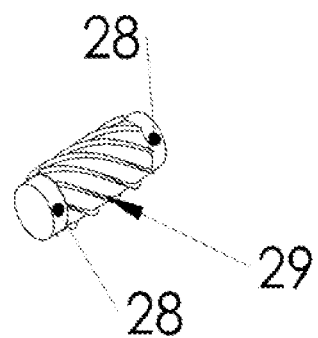
FIG. 9 shows a fastener similar to a U-drive screw that can connect two magnet sections together.
Figure 10:
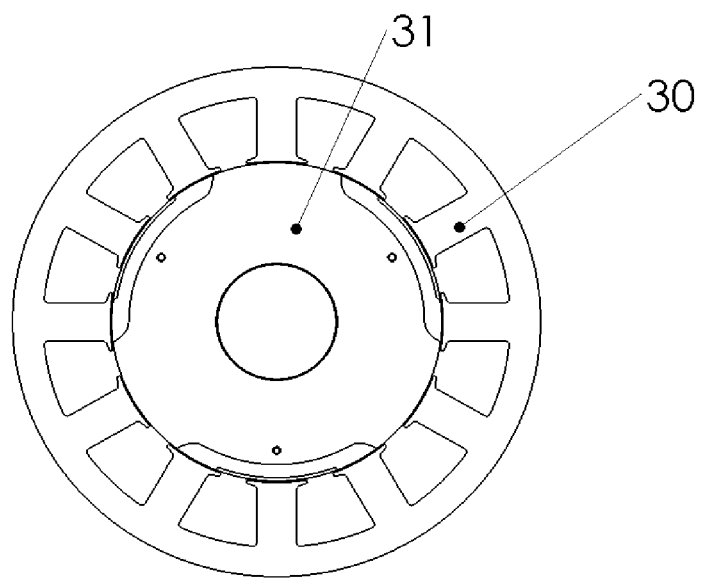
FIG. 10 shows a configuration with the stator outside the rotor for a tab pole motor.
Figure 11:
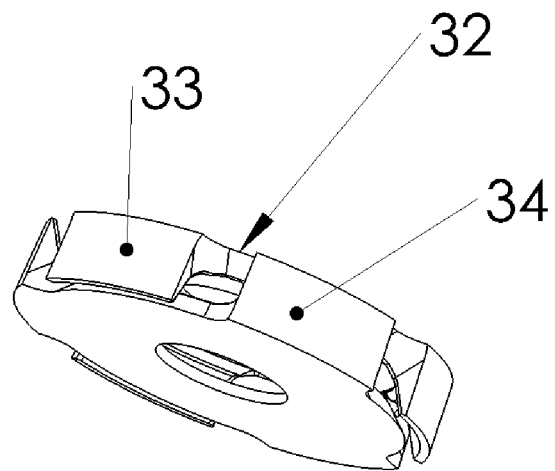
FIG. 11 shows tab pole plates that surround the magnet.
Figure 14:
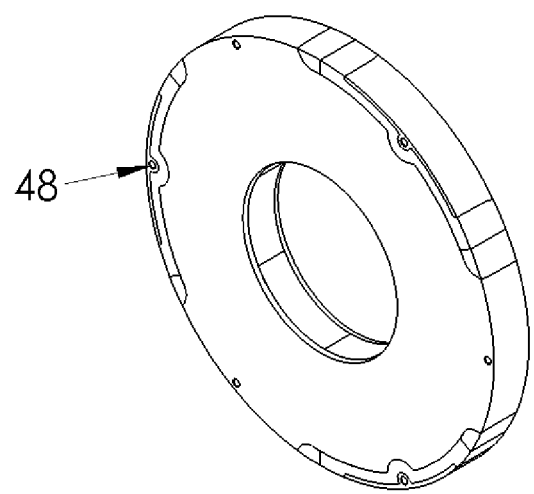
FIG. 14 shows a magnet section with openings for interconnecting sections.

Pole plates may be connected together to connect magnet sections by double-sided U-drive screws as shown in FIG. 9 pressed into openings 15,15, FIG. 3. Lead in portions 28,28 on each end of the screws facilitate entry and splined portions 29, 29 grip the plates for interconnection. An alternate attachment means is shown in FIGS. 13 and 14 where a small through opening 48 may be accommodated by providing a small recess in the magnet at 47.

Figure 6:
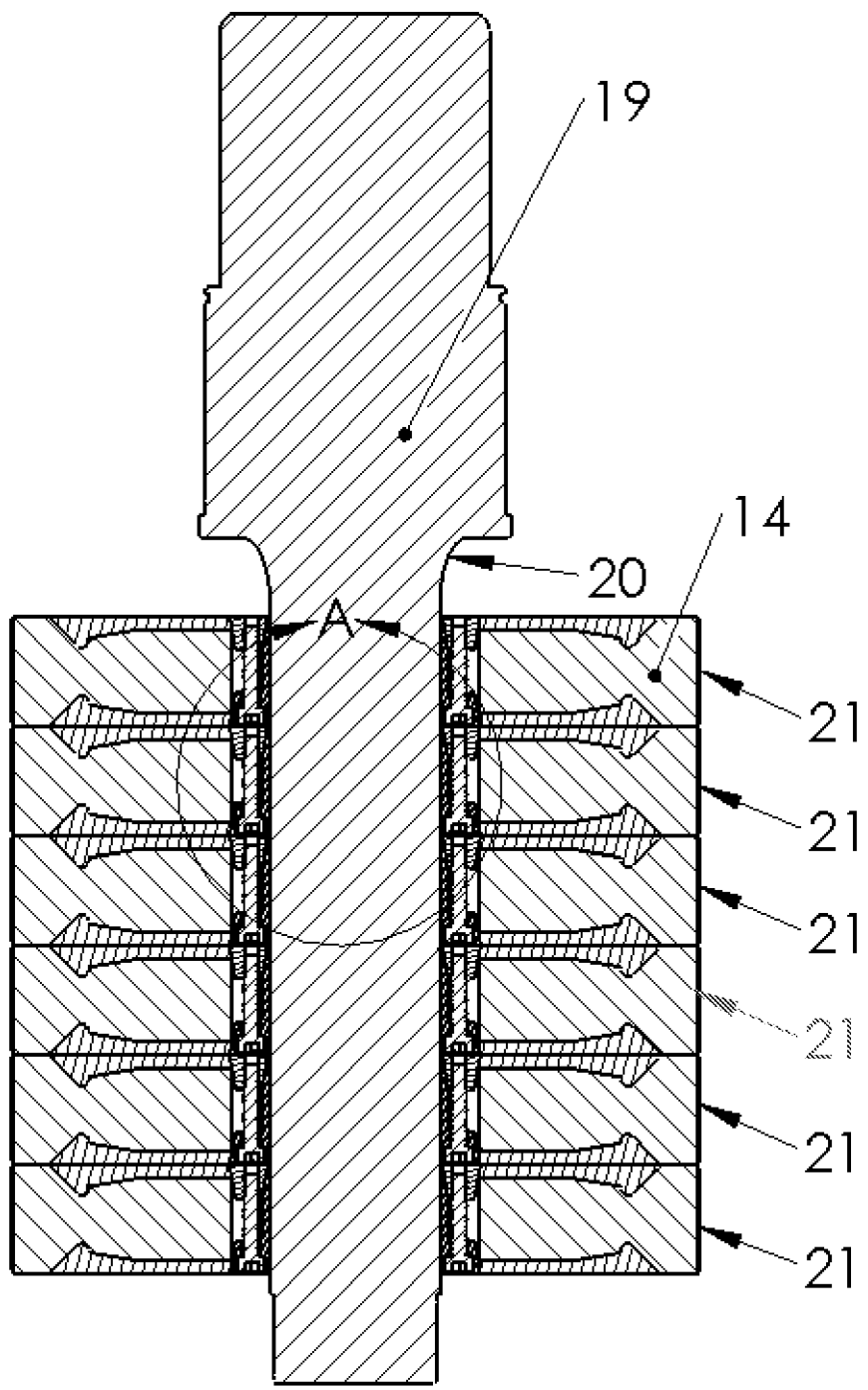
FIG. 6 shows a complete rotor assembly on a common shaft.
Figure 7:
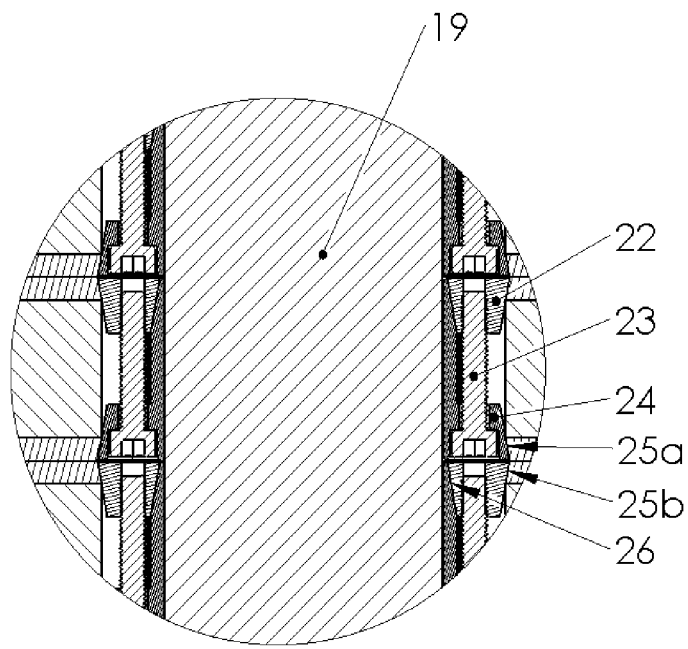
FIG. 7 is an enlarged fragmentary illustration showing a detail view from the center of the cross section shown in FIG. 6.
Figure 8:
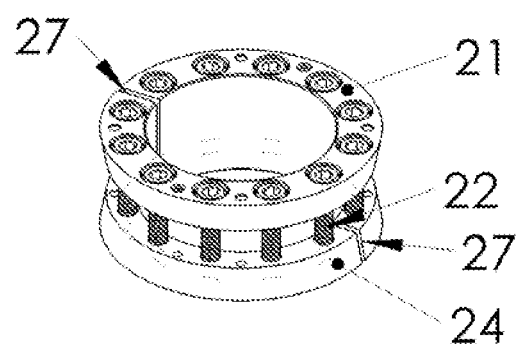
FIG. 8 shows a three dimensional view of the collet assembly.

The shaft may be press fit in a central opening in each magnet section and is preferably enlarged diametrically beyond the magnet sections as shown in FIG. 6 as may be required for external attachment An elliptical transition region 20 is preferred as illustrated.

Finally, individual restraining bands may be provided as at 21, 21 about the circumference of each magnet section or, alternatively, a single large common band or other restraining means may be employed for the several sections. The assembly process for each band may be a thermal shrink fit by heating the band or by cooling the rotor before assembly to insure a tight fit. Depending on geometry the band may be made of either magnetic or nonmagnetic material. For some geometries the best choice is an austenitic grade of stainless steel. In some cases it may be necessary to fill the gap between the magnet and the band with a gap filling material, which hardens when heated, or by other means. Preferably, the gap filing material should have a much lower modulus of elasticity than the magnets or the pole plates.

The invention claimed is:

1. A rotary electric machine with the rotor comprising at least one permanent magnet section with a magnet of magnetically hard material disposed between similar axially spaced pole plates made from magnetically soft material, said magnet having the majority of its interior portion generally shaped to conform to the shape of said pole plates, a plurality of circumaxially spaced peripherally outwardly exposed tabs of soft magnetic material serving to direct flux into circumaxially alternating north and south poles around the periphery of the magnet section, and a plurality of separators of hard magnetic material respectively disposed between said tabs.

2. A rotary electric machine as set forth in claim 1 wherein the tabs are formed integrally with and as extensions from the pole plates.

3. A rotary electric machine as set forth in claim 1 wherein the interior section of the magnet is shaped to be thicker in the center and thinner around the periphery.

4. A rotary electric machine as set forth in claim 1 wherein the magnet section has a through opening at its axis.

5. A rotary electric machine as set forth in claim 1 wherein there are two or more similar magnet sections provided in axially stacked relationship, and wherein the tabs on each magnet sections are arranged for axial alignment with the tabs on axially adjacent magnet sections.

6. A rotary electric machine as set forth in claim 1 wherein the tabs have a non-uniform cross section that is generally smaller in cross section in progression away from the magnetically soft material.

7. A rotary electric machine as set forth in claim 1 wherein the hard magnetic material separators between tabs are formed integrally with the magnet.

8. A rotary electric machine as set forth in claim 1 wherein there is an attachment means located on each of the pole plates.

9. A rotary electric machine as set forth in claim 8 wherein said attachment means is located centrally on each pole plate with respect to at least one of the tabs on said pole plate.

10. A rotary electric machine as set forth in claim 1 wherein the magnet comprises a ceramic ferrite material.

11. A rotary electric machine as set forth in claim 1 wherein the magnet section is surrounded by a structural retaining band.

12. A rotary electric machine rotating as set forth in claim 11 wherein there is a gap filling material inserted between the band and magnet section.

13. A rotary electric machine as set forth in claim 11 wherein the band is made of stainless steel.

14. A rotary electric machine as set forth in claim 1 wherein the pole plates are made of low carbon steel.

15. A rotary electric machine as set forth in claim 1 wherein the pole plates are of cast construction.

16. A rotary electric machine as set forth in claim 15 wherein the pole plates are cast over a preformed magnet.

17. A rotary electric machine as set forth in claim 1 wherein the rotor is internal to the stators.

18. A rotary electric machine as set forth in claim 17 wherein the rotor has a central through opening, and wherein a shaft is provided and is entered in said opening in press fit engagement with the rotor.

* * * * *